UNITED STATES PATENT OFFICE.

HENRICK P. BRIGGS, OF NORTH ADAMS, MASSACHUSETTS.

IMPROVEMENT IN LOOM-SHUTTLES.

Specification forming part of Letters Patent No. 210,292, dated November 26, 1878; application filed May 14, 1878.

*To all whom it may concern:*

Be it known that I, HENRICK P. BRIGGS, of North Adams, in the county of Berkshire and State of Massachusetts, have invented a new and useful Improvement in Loom-Shuttles, of which the following is a specification:

My invention relates to shuttles of all descriptions employed in weaving; and it consists in a shuttle formed of vulcanized fiber.

Shuttles have heretofore been made of various kinds of wood, such as apple-tree, birch, and persimmon. Such shuttles when new are good; but even after limited use, they become splintered and roughened, so that they catch and break the threads of the warp, and cause a great amount of trouble and expense. To remedy this difficulty I take the substance known in the arts as "vulcanized fiber," and form from it shuttles for the various purposes for which shuttles are used.

The vulcanized fiber is manipulated in the manufacture of the shuttle in much the same way as wood.

A shuttle of this description cannot split or splinter, and will outlast the wooden ones.

The vulcanized fiber of which my shuttle is made is extremely tough and hard, and will not crumble or break, and attains a high polish in its backward and forward movement in the race.

I am aware that a material or substance which is intended to be applied to the construction of the various parts of machinery, composed of a preparation of caoutchouc, gutta-percha, sulphur, and earthy or other suitable matters, which, when combined and submitted to a high degree of heat, will form a very hard substance capable of resisting a heavy blow or strain, has heretofore been employed as the material from which loom-shuttles have been made, and I therefore lay no claim to such invention.

My preparation is made of entirely different matter, being composed of cellulose material acted on by chloride of zinc, and particularly adapted to the formation of shuttles, and requiring the application of no heat; and the preparation is not liable to chip or crumble, as is the case in the former construction, disclaimed.

Having thus described my invention, I claim as new and desire to secure by Letters Patent—

A shuttle made of vulcanized fiber, as described.

HENRICK PARSONS BRIGGS.

Witnesses:
 WM. H. FOSMIRE,
 WM. H. DUMVILLE.